C. L. MOHR.
ART OF SAWING METALS.
APPLICATION FILED FEB. 4, 1918.
1,358,971. Patented Nov. 16, 1920.
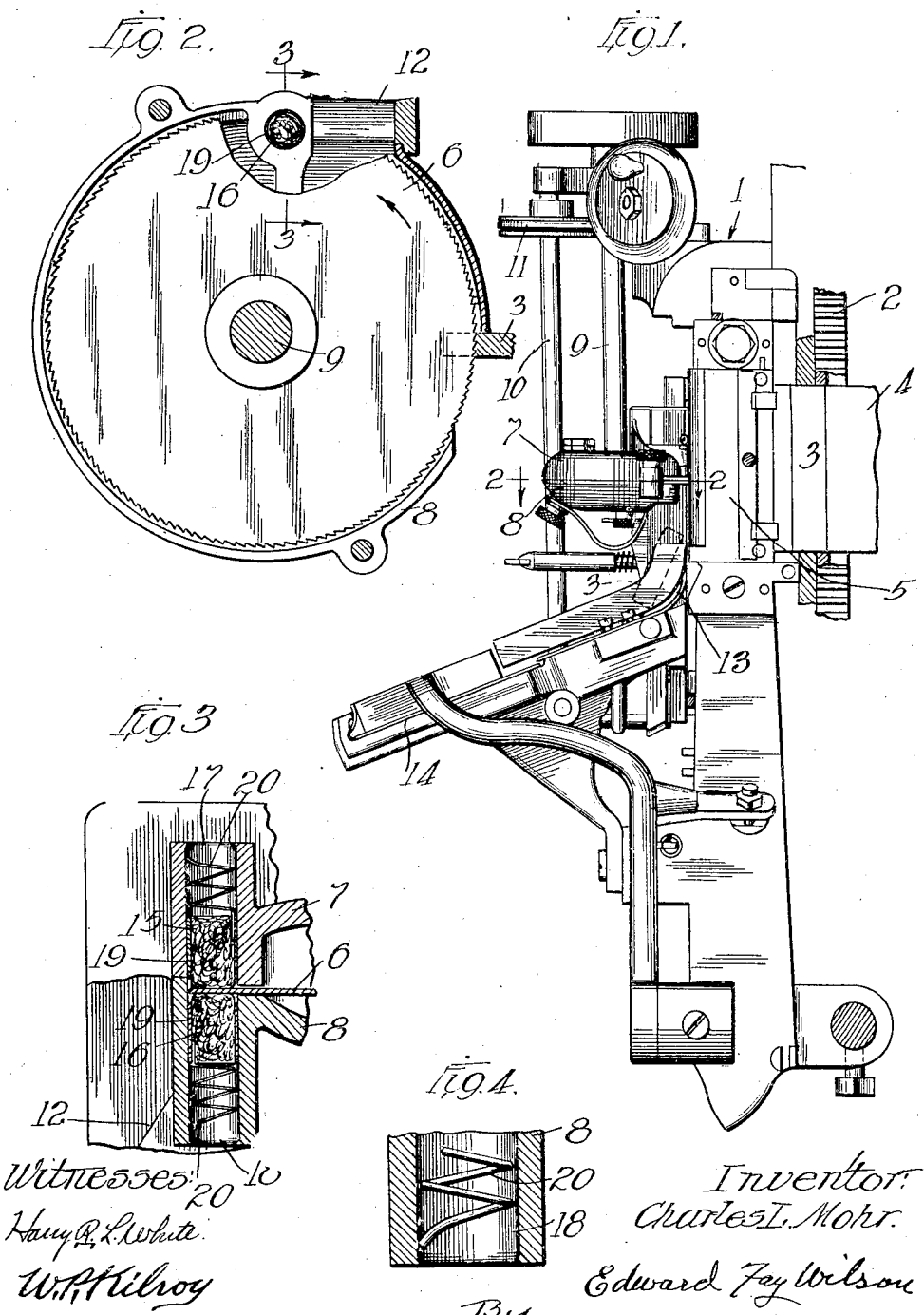

UNITED STATES PATENT OFFICE.

CHARLES L. MOHR, OF CHICAGO, ILLINOIS, ASSIGNOR TO MOHR LINO-SAW COMPANY, OF CHICAGO, ILLINOIS, A CORPORATION OF ILLINOIS.

ART OF SAWING METALS.

1,358,971.  Specification of Letters Patent.  Patented Nov. 16, 1920.

Original application filed March 16, 1914, Serial No. 825,049. Divided and this application filed February 4, 1918. Serial No. 215,289.

*To all whom it may concern:*

Be it known that I, CHARLES L. MOHR, a citizen of the United States, and a resident of Chicago, county of Cook, and State of Illinois, have invented a certain new and useful Improvement in the Art of Sawing Metals, of which the following is a specification.

My invention relates to the art of sawing metals and has particular reference to improvements in means for sawing or cutting relatively soft metals.

The object of my invention is to provide means for accurately cutting relatively soft metallic pieces, such as type metal slugs; to reduce the necessity for frequent sharpening and adjusting of the cutter; and generally to provide an improved cutting device especially adapted for use in cutting linotype slugs or type-bars.

My invention consists in a cutter, such as a saw, in combination with means for continuously applying a relatively small quantity of lubricant thereto.

My invention also consists in a circular saw for cutting relatively soft metal such as type metal, and means for continuously applying lubricant to the side faces thereof.

My invention also consists in a circular saw and keeps same smooth and free of particles of metal mounted in a casing and arranged for cutting linotype slugs, and felt pads adapted to contact with the side faces of the saw adjacent to its periphery, said pads adapted to contain oil and continuously deliver same to and upon the saw.

My invention also consists in the several features of construction and in the combinations and relations of parts by means of which I am enabled to attain the above described and other objects and all as hereinafter described and claimed.

My invention will be more readily understood by reference to the accompanying drawings forming a part of this specification, and in which:—

Figure 1 is a fragmentary elevation of a portion of a linotype machine showing the application of my invention to a linotype slug cutting saw;

Fig. 2 is a fragmentary horizontal section on the line 2—2 of Fig. 1;

Fig. 3 is a fragmentary vertical section on the line 3—3 of Fig. 2; and

Fig. 4 is an enlarged fragmentary sectional view showing the end of the pad holding spring engaging the wall of the pad opening.

In cutting linotype slugs with a circular saw the type metal has a tendency to adhere to the side faces of the saw. The type metal first adheres in very small particles or patches, which particles seem to build up by additional particles adhering thereto. The result of this is that the severed ends of the slugs are not as straight and true as desired, nor are the slugs of their desired length, and if this process is permitted to go on the utility of the device is destroyed. Until my invention was applied, it was necessary frequently to take the device apart and scrape the saw. Instead of only running the device a day or two, as formerly before having to scrape and sharpen it, I am now enabled to run the device for many months, cutting many hundreds of slugs a day, without the necessity of taking out the saw and caring for it.

In said drawings 1 represents a portion of a linotype machine, particularly that portion by which the cast slug is ejected and assembled together for use. The linotype machine is provided with a mold wheel 2 having mold slots in which slugs 3 are cast. The machine also has a reciprocating slug ejector 4. The slug is ejected through a mechanism 5 by which it is trimmed to certain standard dimensions as to thickness, and I arrange a circular saw 6 in the path of the slug to cut it in two as it is ejected. The saw is arranged in a practically closed casing consisting of an upper part 7 and a lower part 8. The saw is mounted on the lower end of a vertical shaft 9, and this shaft is adapted to be rotated at relatively high speed by any suitable means such as the power shaft 10 and belt 11. As described, the saw is arranged in the path of the slug, that is, between its ends, and is adapted to cut the slug into an upper part and a lower part as the slug is ejected. The upper part is waste and falls down the waste chute 12, while the lower part is the part having the printing characters thereon and is the part which it is desired to use. The lower part falls down the chute 13 upon the "stick" 14 to be assembled there with other like slugs for use.

The saw 6 is inclosed within the casing and is rotated in the direction of the arrow on Fig. 2, and I provide felt pads or rubbers 15 and 16, one above and the other below the saw 6. Preferably the pads are cylindrical and are mounted within cylindrical openings 17 and 18, respectively, in which the pads may freely move. Preferably the pads are arranged in and carried by thin walled open ended tubes 19 which slidingly fit within the openings 17 and 18, which preferably are arranged, as shown, adjacent to the periphery of the saw. The inner ends of the pads project beyond the inner ends of the tubes 19 so that the pads will contact with the side faces of the saw as best shown in Fig. 3, and the inner ends of the tubes 19 will be free of the saw. Obviously the rubbing action of the pads upon the sides of the saw continuously keeps the saw bright, smooth and free of particles of metal. To hold the pads in contact with the saw, I provide very light coiled springs 20 which fit freely within the openings 17 and 18, their inner ends contacting with the outer ends of the pads. These springs are preferably made of relatively hard wire such as piano wire, and their outer ends are formed to engage the inner wall of the openings 17 and 18, as shown in the enlarged fragmentary view in Fig. 4. The wire being hard and having a relatively sharp or square cut end, the edge of the end engages the wall of the opening and holds the spring in the position in which it is placed, and yet it is very easily and quickly withdrawn when it becomes necessary to reoil or repair the pads. The pads 15 and 16, as explained, are preferably made of felt, which is a material adapted to hold and gradually yield up a lubricant such as oil.

As these pads are gently pressed into contact with the saw near its periphery by the springs 20 and as they contain oil, they are adapted to continuously deliver oil or lubricant upon the side faces of the saw. The effect of this is to prevent the initial sticking of the small specks or particles of the type metal to the saw, and consequently the saw can run continuously or for a long time, without the necessity of repair.

This application is a division of my copending application, Serial Number 825,049, filed March 16, 1914, for patent on linotype machines.

As many modifications of my invention will readily suggest themselves to one skilled in the art, I do not limit or confine my invention to the specific structure herein shown and described except within the scope of the appended claims.

I claim:

1. The herein described improvement comprising a circular saw adapted for cutting relatively soft metal, and means contacting with the saw for continuously applying oil to the side faces thereof adjacent to the periphery as and for the purpose specified.

2. The herein described improvement comprising a relatively thin circular saw adapted to cut type-metal bars, and oil absorbent pads held in yielding contact with the side faces thereof adjacent to its periphery.

3. In a linotype machine, a circular saw for cutting the type-bars as they are ejected, and oil absorbent pads held in yielding contact with the side faces of the saw as and for the purpose specified.

4. In a linotype machine, a circular saw for cutting the type-bars as they are ejected therefrom, a closed casing in which the saw is mounted for rotation, oil absorbing pads movable in said casing and having their inner ends contacting with the side faces of the saw adjacent to its periphery, and springs holding said pads yieldingly against the saw.

5. In a linotype machine, a circular saw for cutting the type bars as they are ejected therefrom, a casing in which the saw is mounted for rotation, said casing having openings extending through the walls thereof, oil absorbing pads slidable in said openings having their inner ends in contact with the side faces of the saw, and springs in said openings yieldingly holding said pads against the saw.

6. The herein described improvement, comprising a circular saw adapted for cutting relatively soft metal, and means contacting with the saw for continuously applying a lubricant to the side faces thereof, as and for the purpose specified.

7. In a linotype machine, a circular saw for cutting the type-bars as they are ejected therefrom, a casing in which the saw is mounted for rotation, said casing having an opening extending through a wall thereof, an oil absorbing pad slidable in said opening having its inner end in contact with one face of the saw, and means yieldingly holding said pad against the saw.

8. The herein described improvement comprising a circular saw for cutting relatively soft metal such as type metal, an oil absorbent pad held in yielding contact with one side of the saw and adapted to rub same and deliver lubricant to and upon the saw.

In testimony whereof, I have hereunto set my hand this 2 day of February, A. D. 1918.

CHARLES L. MOHR.